United States Patent [19]
Waldorf

[11] Patent Number: 4,570,736
[45] Date of Patent: Feb. 18, 1986

[54] DUAL FLOW VARIABLE ASSIST POWER STEERING GEAR MECHANISM

[75] Inventor: Raymond D. Waldorf, Milford, Mich.

[73] Assignee: Ford Motor Company, Dearborn, Mich.

[21] Appl. No.: 689,264

[22] Filed: Jan. 7, 1985

[51] Int. Cl.⁴ ............................................. F15B 13/04
[52] U.S. Cl. ..................................... 180/143; 91/467; 137/625.23
[58] Field of Search ............... 180/143, 141, 148, 132; 137/625.23; 91/467, 375 A; 92/163, 166, 167

[56] References Cited
U.S. PATENT DOCUMENTS

| | | | |
|---|---|---|---|
| 4,063,490 | 12/1977 | Duffy | 91/467 |
| 4,071,109 | 1/1978 | Ezoe | 180/143 |
| 4,186,818 | 2/1980 | Jablonsky | 180/133 |
| 4,189,024 | 2/1980 | Jablonsky | 180/133 |
| 4,311,171 | 1/1982 | Roberts | 91/467 |
| 4,516,471 | 5/1985 | Duffy | 91/467 |

Primary Examiner—John A. Pekar
Assistant Examiner—Donn McGiehan
Attorney, Agent, or Firm—Donald J. Harrington; Keith L. Zerschling

[57] ABSTRACT

A power steering gear mechanism for an automotive vehicle having a pressure operated vehicle steering mechanism controlled by a rotary valve with primary and secondary valve portions located in angularly spaced relationship on a common transverse reference plane wherein the primary valve portion develops a fast-rising steering pressure characteristic for incremental changes in steering torque at low driving speeds and a flatter or more gradual steering pressure rise characteristic for incremental changes in steering torque at high driving speeds, the latter resulting from the action of the secondary valve portion which functions in cooperation with the primary valve portion whereby the pressure versus torque relationship is optimized for parking maneuvers, for driving maneuvers and for center-feel, the change from the low speed steering mode to the high speed steering mode being gradual whereby the center-feel increases in proportion to increasing road speed.

6 Claims, 8 Drawing Figures

DUAL FLOW VARIABLE ASSIST POWER STEERING GEAR MECHANISM

GENERAL DESCRIPTION OF THE INVENTION

My invention relates to improvements in power steering gear mechanisms for automotive vehicles. It is especially adapted for use with rack and pinion steering gear mechanisms although it is capable also of being used with sector gear power steering gear mechanisms as well as other power assist devices. A typical example of a rack and pinion power steering gear mechanism for automotive vehicles is shown in U.S. Pat. No. 4,063,490.

Rack and pinion steering gear systems for automotive vehicles comprise a pressure operated piston that is connected to or is formed integrally with a gear rack, the latter in turn engaging a drive pinion that actuates the steering linkage of the vehicle. A torsion bar connects the pinion with a driver controlled steering shaft, and it is deflected as steering torque is applied to it.

The rack and pinion steering gear shown in U.S. Pat. No. 4,063,490 includes a rotary steering valve wherein a valve sleeve is connected to the driver operated steering shaft and the steering shaft is connected to the pinion through the torsion bar. The driver controlled steering shaft forms a part of or is integral with an inner valve member that registers with internal valve lands in the valve sleeve. Upon application of steering torque by the vehicle operator the torsion bar deflects thereby causing relative displacement of the inner valve member with respect to the sleeve. The sleeve and the inner valve member thus are capable of controlling pressure distribution to each of two pressure chambers on either side of a pressure operated piston, the latter in turn being connected to a gear rack that is engaged by the pinion.

In other types of power steering gear mechanisms the driving shaft is connected to a worm shaft that is connected to an actuating piston by means of a recirculating ball nut assembly. Examples of such an arrangement are seen in U.S. Pat. No. 4,189,024. Like patent '490, patent '024 uses a rotary pressure distribution valve having a sleeve connected to the power output drive pinion and an inner valve member registering with valve lands in the sleeve. The inner valve member is connected to the steering shaft. The steering shaft is connected to the pinion through a yieldable torsion bar. Other power steering gear mechanisms use axially displaceable valve elements wherein application of torque to the steering shaft results in relative angular displacement of an inner valve member with respect to a valve sleeve. The inner valve member is held in centered relationship with respect to the sleeve by a spring which in the embodiments described in the preceding paragraphs is a torsion bar. A centering "C" spring, or its equivalent, rather than a torsion bar could be used.

A pressure buildup is created in one pressure chamber or the other for the fluid motor portion of the mechanism depending upon the direction of the applied torque. The steering gear mechanism responds to the application of steering torque with a controlled responsiveness. This characteristic involves design compromises in prior art devices because the most desirable pressure boost for low speed driving and packing maneuvers is higher than the power assist that is desirable for high speed steering maneuvers.

An improvement in such steering systems is described in co-pending application Ser. No. 430,223, filed by J. J. Duffy on Sept. 20, 1982, which is assigned to the assignee of this application. That co-pending application describes a valve mechanism having primary and secondary portions that are relatively displaceable and wherein each portion is capable of effectively metering fluid delivered to the system from a positive displacement power steering pump. The primary portion of the steering valve is effective to establish a controlled metering action within a first range of deflection and the secondary valve portion establishes an effective metering action during relative displacement of the valve elements throughout a greater deflection range. A separate pressure supply passage is used for each of the valve portions, and a speed responsive valve mechanism opens a flow circuit through the fluid supply passage for the secondary valve passage at high vehicle speeds and closes it at low vehicle speeds. Thus a single pressure distribution passage through the valve mechanism from the power steering pump is effected at low vehicle speeds, but a parallel flow path through both passages to the valve mechanism occurs at higher speeds.

The primary valve portions assume a close flow restricting position at a relatively small displacement of the steering shaft relative to the driving pinion—for example, 2 degrees. Thus a torsion resistance of the valve centering spring is small for any given steering pressure. Above the speed at which the speed sensitive valve is triggered a parallel flow path is provided to both valve portions. At that time the secondary valve lands are adapted to close at a greater angular displacement of the steering shaft relative to the driving pinion. Since the secondary valve closes at a higher deflection of the centering spring—for example, 5 degrees rather than 2 degrees—the deflection and torsional resistance of the centering spring are greater for any given steering pressure. The optimum steering characteristics for high speed can be achieved, therefore, without compromising the steering characteristics that are desirable for low speed steering maneuvers or for packing maneuvers.

The valve arrangement shown in application Ser. No. 430,223 has the primary portion axially separated from the secondary portion of the valve. This requires the use of eight sets of metering lands that are arranged with pressure isolating seals or dams between the primary portion and the secondary portion.

The improvements of my invention do not require the use of a flow or pressure isolating dam between the primary and secondary portions. This eliminates the machining operation required for a dam and it makes possible a reduction in the axial length of the valve itself.

In my improved construction the primary valve portions and the secondary valve portions are arranged generally in the same axial plane rather than in axially spaced planes as in the disclosure of Duffy patent application Ser. No. 430,123. The registering valve lands of each valve portion and their associated pressure supply ports are situated at angular positions about the valve centerline in a common transverse plane.

PARTICULAR DESCRIPTION OF THE INVENTION

Figure 1:
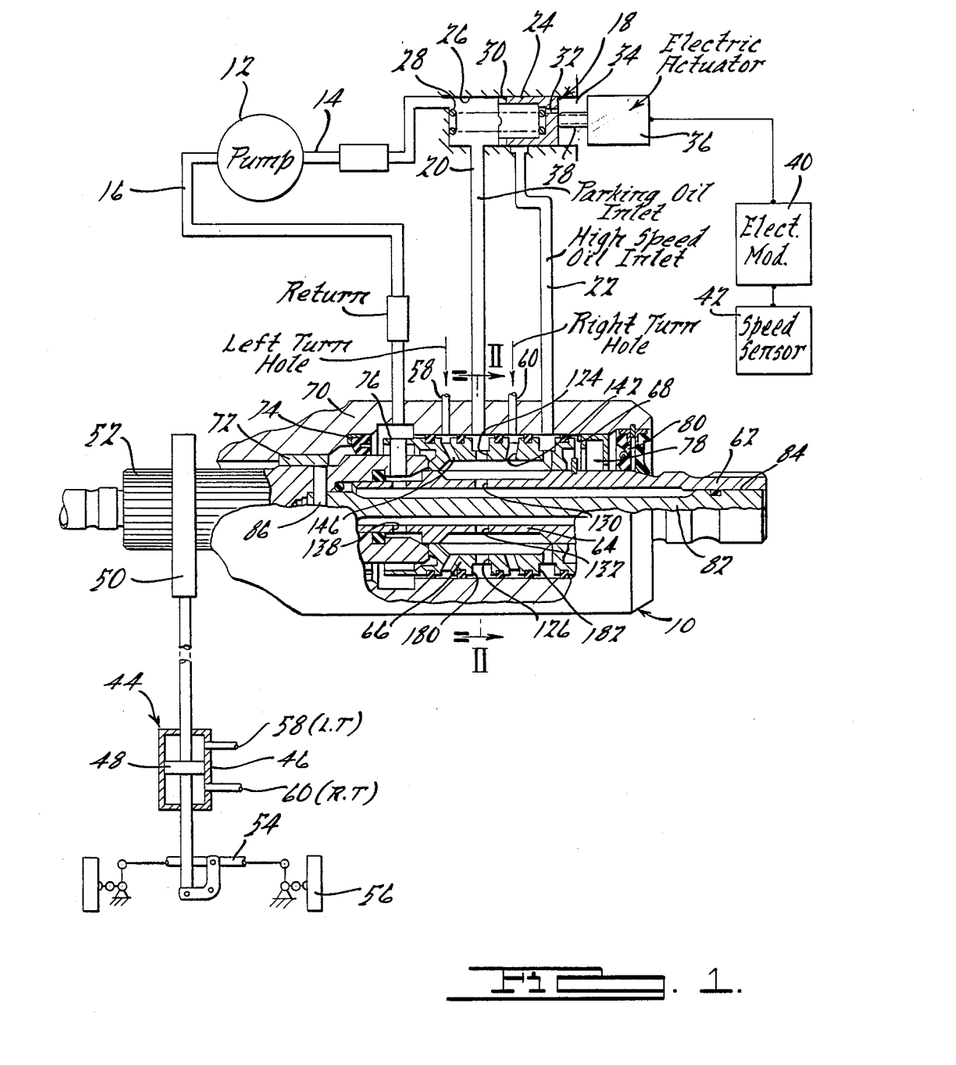
FIG. 1 shows in cross-sectional form a power steering gear mechanism embodying the improved valve structure of my invention.

In FIG. 1 numeral 10 designates a power steering valve assembly for a power steering system. It is supplied with pressure from a positive displacement pump 12 of conventional design. It has a flow control valve that maintains a constant flow in outlet passage 14 regardless of the speed at which it is driven by the vehicle engine. A flow return passage 16 connects the intake side of the pump 12 with the low pressure side of the valve assembly 10.

Delivery passage 14 communicates with the input side of a vehicle speed sensitive valve 18. The outlet side of the valve 18 communicates with a low speed or parking inlet oil passage 20 and a high speed oil inlet passage 22.

Valve 18 comprises a valve spool 24 slidably received in a valve chamber 26. Valve spool 24 is urged in a right hand direction by valve spring 28. It is adapted to establish communication between delivery passage 14 and the parking or low speed oil inlet passage 20. Valve 18 is adapted also to establish control communication between delivery passage 14 and the high speed oil inlet passage 22 when the valve spool 24 is positioned as shown, communication between delivery passage 14 and high speed oil inlet passage 22 is interrupted. When the valve spool 24 is moved in a right hand direction, communication is established progressively between delivery passage 14 and passage 22. By preference a crescent recess is provided in the left hand end of the spool 24 as shown at 30 to permit a progressive uncovering of the passage 22 upon movement of the spool 24 in a right hand direction from the position shown in FIG. 1.

The pressure on the left hand side of the spool 24 is equal to the pressure on its right hand side because of the presence of a bleed orifice 32 which establishes communication between the left hand side of the valve chamber 26, which is occupied by spring 28, and the right hand side 34.

An electric actuator motor 36 is positioned on the right hand side of the spool 24. It includes an actuator screw 38 which is adapted to engage the spool 24. When the motor 36 is actuated in one direction, screw 28 is extended thereby causing spool 24 to restrict passage 22. When it is actuated in the opposite direction, screw 38 is withdrawn thereby permitting spring 28 to shift the spool 24 to establish progressive communication between delivery passage 14 and high speed oil inlet passage 22. The actuator 26 is under the control of electronic module 40 which is adapted to move the actuator 36 in one direction or the other depending upon the value of a speed signal received by the module 40 from a vehicle speed sensor 42. The steering gear mechanism includes a fluid motor 44 having a cylinder 46 and a pressure actuated piston 48. The piston 48 is connected to a gear rack 50, the latter being in mesh with a driving pinion 52. A steering gear linkage 54 connects the piston 48 and the rack 50 to dirigible wheels for the vehicle as schematically shown at 56. A first pressure passage 58 distributes steering assist pressure to one side of the piston 48 for left turn maneuvers and another pressure passage 60 distributes assist pressure to the opposite side of the piston 48 for right turn maneuvers.

Steering torque is applied to steering shaft 62 by the vehicle operator. An internal valve member 64 is formed integrally with the shaft 62. It is received rotatably in valve sleeve 66, which in turn is mounted rotatably in sleeve housing 68 formed in valve housing 70.

Pinion 52 is rotatably supported by a bushing 72 in the left hand end of the housing 70. The valve chamber 68 in the housing 70 is sealed by fluid seal 74 which surrounds the right hand end of the pinion 52. A drive pin 76 connects drivably the left hand end of the sleeve 66 with the pinion 52 so that the valve sleeve will rotate with the pinion during steering maneuvers.

The right hand end of the shaft 62 is rotatably supported by bearing 78 in the valve housing 68. Fluid seal 80 seals the right hand end of the valve chamber 68.

A torsion bar 82 is connected at 84 to the right hand end of the steering shaft 62. The left hand end of torsion bar 82 is pinned at 86 to the pinion 52. Thus torque applied to the shaft 62 is transmitted through the torsion bar directly to the pinion 52.

The torsion bar 82 is adapted to deflect angularly in direct proportion to the magnitude of the torque applied to the shaft 62. Such angular deflection is accompanied by angular displacement of the valve member 62 relative to the sleeve 66.

Figure 2:
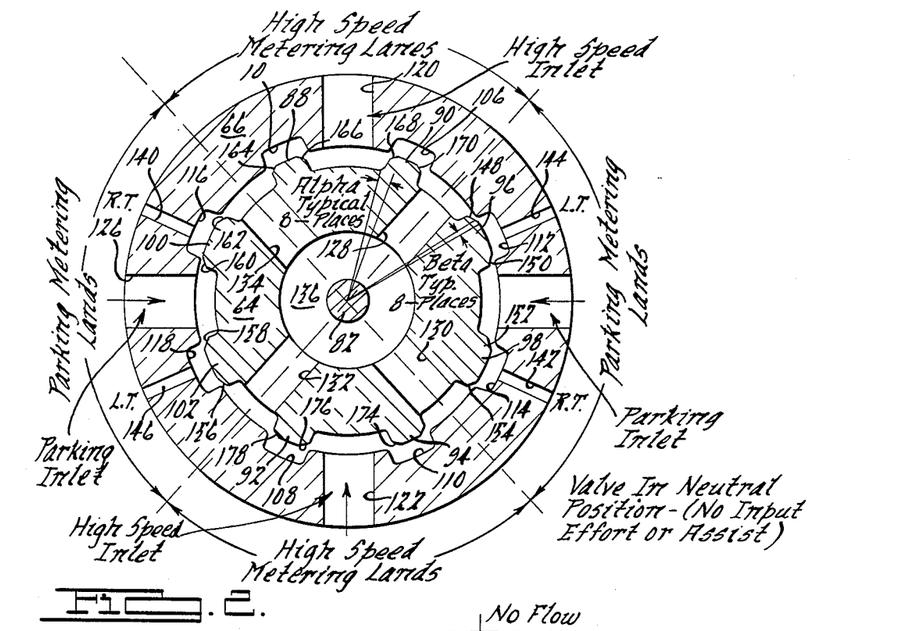
FIG. 2 is a cross-sectional view of the valve mechanism of my invention as seen from the plane of section line II—II of FIG. 1. The valve portions shown in FIG. 2 are in the position that is present during neutral straight-ahead driving with no input effort or power assist.

In FIG. 2 I have shown a cross-sectional view of the valve 64 and the sleeve 66. Valve 64 includes eight external valve lands arranged in pairs. Valve lands 88 and 90 form one pair of a high speed oil metering valve and valve lands 92 and 94 form another pair of a high speed metering valve. A pair of low speed metering lands is shown at 96 and 98 and a companion pair of low speed metering lands is shown at 100 and 102. Valve lands 88 and 90 act in tandem and in parallel relationship with respect to valve lands 92 and 94. Similarly, valve lands 96 and 98 operate in tandem and in parallel relationship with respect to lands 100 and 102.

Lands 88 and 90 register with internal valve lands in the sleeve 66 formed by axial slots 104 and 106. The corresponding slots for the lands 92 and 94 are shown at 108 and 110, respectively.

Low speed valve lands 96 and 98 register with internal valve lands in sleeve 66 defined by slots 112 and 114, respectively. The companion slots in the sleeve 66, which register with external lands 100 and 102, are shown at 116 at 118, respectively. A high speed oil inlet passage in the sleeve 66 is shown at 120 and the companion high speed oil inlet passage on the opposite side of the sleeve is shown at 122. Two low speed parking oil inlet passages diametrically opposed are shown at 124 and 126. These are spaced 90 degree out of position with respect to passages 120 and 122.

Oil return passages are provided at 90 degree intervals in the inner valve member 64 as shown at 128, 130, 132 and 134. One oil return passage is located between each adjacent pair of high speed and low speed lands on the valve member 64. These return passages communicate with the center passage 136 formed in the valve member 68. Passage 136 communicates with return line 16 through radial ports 138 in the valve member 64.

Right turn port 140 communicates with passage 60 as does right turn port 142. Similarly left turn port 144 and left turn port 146 communicate with left turn passage 58. Right turn passages 140 and 142 communicate respectively with grooves 116 and 114. Left turn passages 144 and 146 communicate respectively with grooves 112 and 118, respectively.

In FIG. 2 the angle beta represents the angle of deflection that would occur before communication between left turn port 144 and radial passage 128 is interrupted when torque is applied to the shaft 62. In FIG. 2 valve 64 is positioned relative to the sleeve 66 in FIG. 2 as it would be for neutral operation with no input effort or power assist. Upon deflection of the member 64 relative to the sleeve through an angle beta, which may be 2 degrees, valve land 96 seals and interrupts flow between passage 128 and port 144. A greater angular deflection of member 64 relative to the sleeve must occur before land 90 registers with and seals the grooves 164 to interrupt flow between port 120 and groove 106. That angular deflection is represented by the symbol alpha, which in a working embodiment might be 5 degrees.

In FIG. 2 the circumferential location of the ports and the passages is correct. FIG. 2 is divided in 4 quadrents, each of which operates in either the high speed mode or the packing mode as indicated. Parking oil inlets 124 and 126 and the associated metering edges 148, 150, 152 and 154 and metering edges 156, 158, 160, and 162 are used exclusively when packing or operating at low speeds and are used in combination with the remaining high speed inlets and lands at higher speeds. The high speed inlets are identified at 120 and 122 and the high speed metering edges are identified by reference numerals 164, 166, 168 and 170 and by the reference numerals 172, 174, 176 and 178.

The parking inlets 124 and 126 communicate with inlet annulus 180 shown in FIG. 1, which is axially displaced and sealed from high speed inlets 120 and 122. These high speed inlets communicate with a common annulus 182 shown in FIG. 1.

The underlap of a pair of metering edges as seen in FIG. 2 is defined as the angular rotation from the neutral position which causes the external lands on the valve 64 to start to overlap the lands of the registering sleeve. A pair of metering edges starts to become restrictive with respect to the fluid flow just prior to lapping for approximately one degree of relative angular position. The underlap angles at the high speed metering edges are approximately twice as large as the underlap angles at the packing metering edges. Since the input efforts are approximately equal to the valve underlaps less approximately one degree multiplied by the torsion bar stiffness, the effort in the parking mode will be approximately one-half the effort in the high speed mode for the same amount of power assist. This is represented by the following relationship:

$$\frac{\text{High Speed Efforts}}{\text{Parking Efforts}} = \frac{\text{Alpha} - 1.0}{\text{Beta} - 1.0} = 2.0$$

In the parking mode oil flows only through inlets 124 and 126. In the high speed mode the speed sensitive valve 18 allows oil to flow also to the high speed lands. The high speed lands, when they are fed with actuating fluid from the pump, act as a bleed valve which prevents power assist in the parking lands until sufficient effort is applied to cause the high speed lands to become restrictive. In other words, if the hydraulic oil is permitted to flow both through the parking lands and the high speed lands and only the parking lands are restricted, then most of the flow will occur through the high speed lands without causing a power assist. The change from the parking mode to the high speed mode can be accomplished gradually by controlling the amount of oil that is permitted to flow to the high speed lands in accordance with a signal received by the actuator 36 from the module 40.

Figure 3:
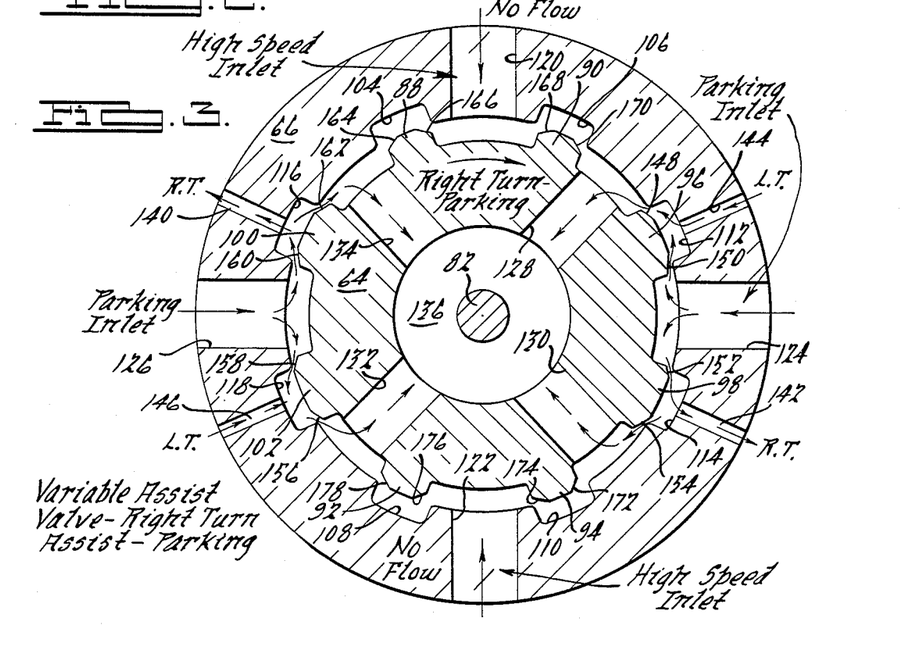
FIG. 3 is a cross-section view similar to FIG. 2 wherein the valve portions assume the position that exists during a right turn steering maneuver under low speed operation or during parking maneuvers.

FIG. 3 shows the improved valve structure of my invention operating in a right turn at low speeds or during parking maneuvers. At this time oil is prevented by the valve 18 from entering high speed inlets 120 and 122. The small underlaps at 150, 154, 158 and 162 become restrictive sufficiently for parking thus producing a pressure in the fluid motor of about 1,000 psi at about 1.75 degrees of relative angular displacement. Metering edges at 152 and 160 are open to allow flow to the right turn side of the power assist fluid motor. Likewise metering edges 148 and 156 are opened to allow flow from the left turn side of the power assist fluid motor. If the torsion bar has a characteristic of 10 lb. - inches per degree of deflection, the effort would be 7.5 lb. - inches. During a left turn mode the valve operates in a similar fashion because of the symmetrical relationship of the valve lands.

Figure 4:
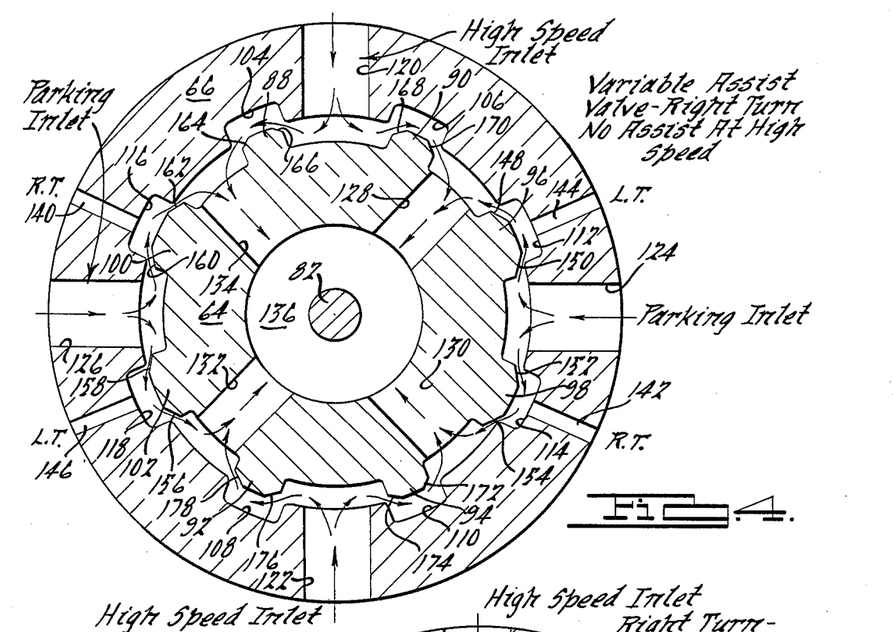
FIG. 4 is a view similar to FIG. 2 wherein the valve portions are shown in the position that occurs during a right turn with no power assist when the vehicle is operating at high speed.

FIG. 4 shows the proposed valve operating in a right turn in the high speed mode but without adequate input to provide an assist. In this situation the amount of the input torque is sufficient to cause the assist if the parking circuit were operating alone. However, since inlet oil is also externally permitted to enter the high speed lands and the input is not sufficient to cause these lands to become restrictive, most or all of the flow occurs through inlet ports 120 and 122 and across the metering edges 164, 166, 168 and 170 and through metering edges 172, 174, 176 and 178 without significantly increasing the pressure drop through the valve. The left turn mode operates in the same fashion because of the symmetrical relationship of the valve and will not be described in separate detail.

Figure 5:
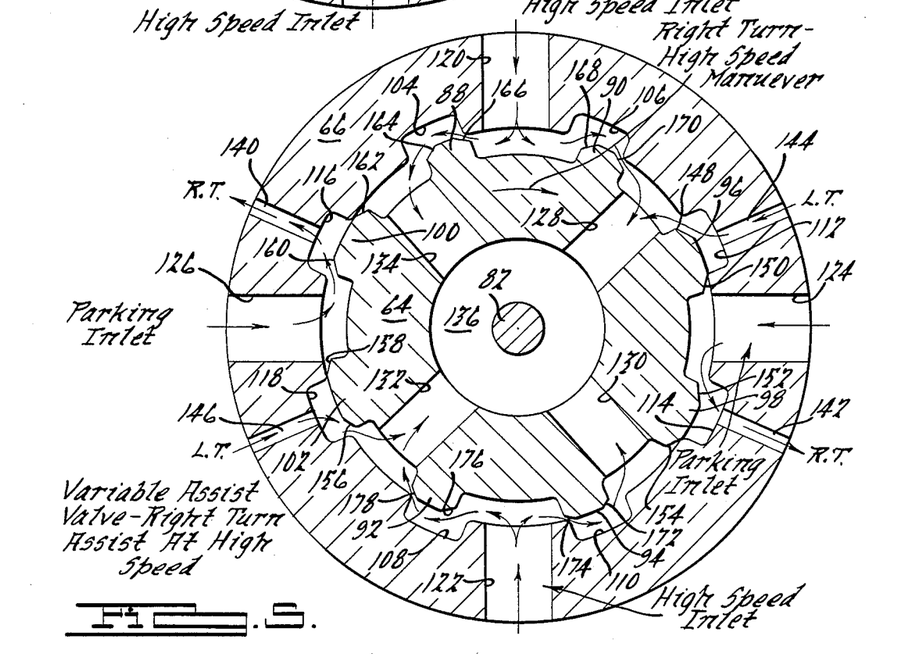
FIG. 5 is a view similar to FIG. 2 wherein the valve portion is shown in the position that occurs during a right turn with power assist at high speeds.

FIG. 5 shows the valve operating in the high speed mode during a right turn maneuver. Parking lands 150, 154, 158, and 162 are lapped at this time, and therefore, permit no flow. Parking lands 152 and 160 are opened causing any flow which passes through the parking inlet holes to be directed to the right turn side of the fluid motor 44. High speed lands 166, 170, 174 and 178 are lapped sufficiently to be restrictive. That is, they are lapped approximately 3 degrees to cause an assist pressure of about 200 pounds per square inch in the fluid motor. The back pressure caused by the high speed lands is communicated back through the external flow control valve 18 through the parking inlets at 124 and 126, through the open metering lands at 152 and 160 and through right turn ports 140 and 142 to the right turn side of the power assist cylinder 46. The left turn mode is similar in its mode of operation because of the symmetric relationship of the valve lands.

Figure 6:
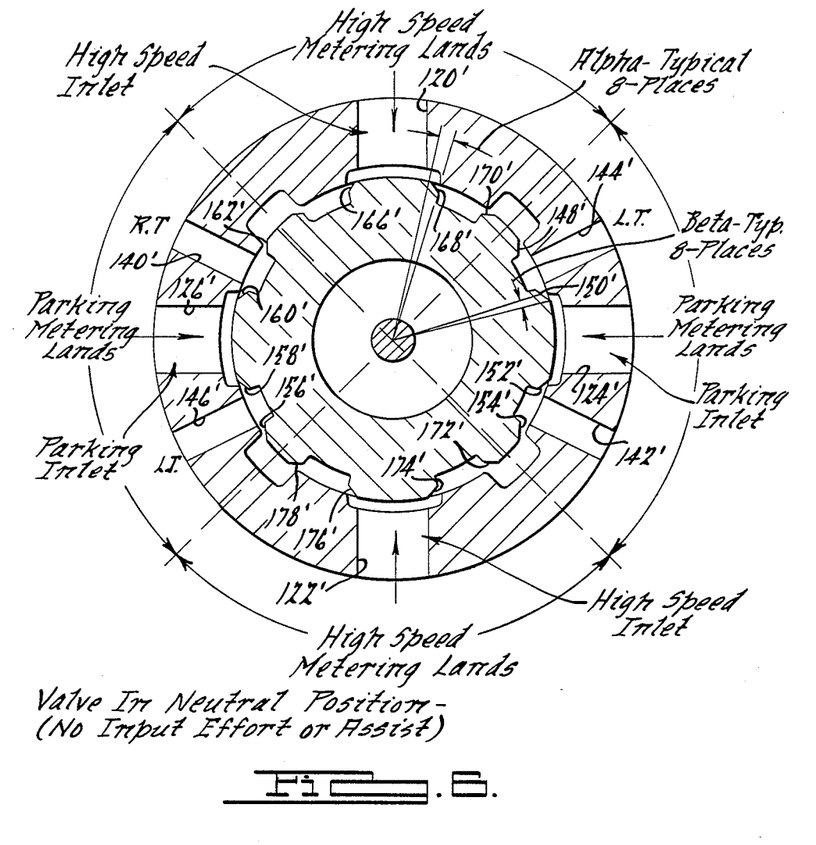
FIG. 6 is a view similar to FIG. 2 although it shows an alternate embodiment of the valve structure. The valve elements of the embodiment of FIG. 6 are in the condition that exists during a neutral condition with no steering effort or power assist.

In the alternate version shown in FIG. 6, the lands for the sleeve and the inner valve member are optimized for a minimum pressure drop. In FIG. 6 the inlet holes are placed in slots in the sleeve rather than between the slots as in the previous embodiment. The left and right turn holes are placed between the slots instead of in the slots as in the previous embodiment. The inlet holes are wide to allow for maximum diameter, which contributes to a reduction in pressure drop. The return slots are deeper than the inlet slots and are open at both ends to allow the oil to exit the sleeve with a minimum pressure drop. In contrast, all eight slots of the valve for the previous embodiment corresponding to these return slots are closed at both ends. Return holes are not required in the input shaft of the FIG. 6 embodiment although they are required in the previously described embodiment.

The mode of cooperation between the lands for both high speed operation and low speed operation which was discussed above with respect to the previous embodiment apply also with respect to the embodiment of FIG. 6. For this reason, the reference numerals used in describing the previous embodiment have been repeated in the FIG. 6 embodiment although prime notations are used.

Figure 7:
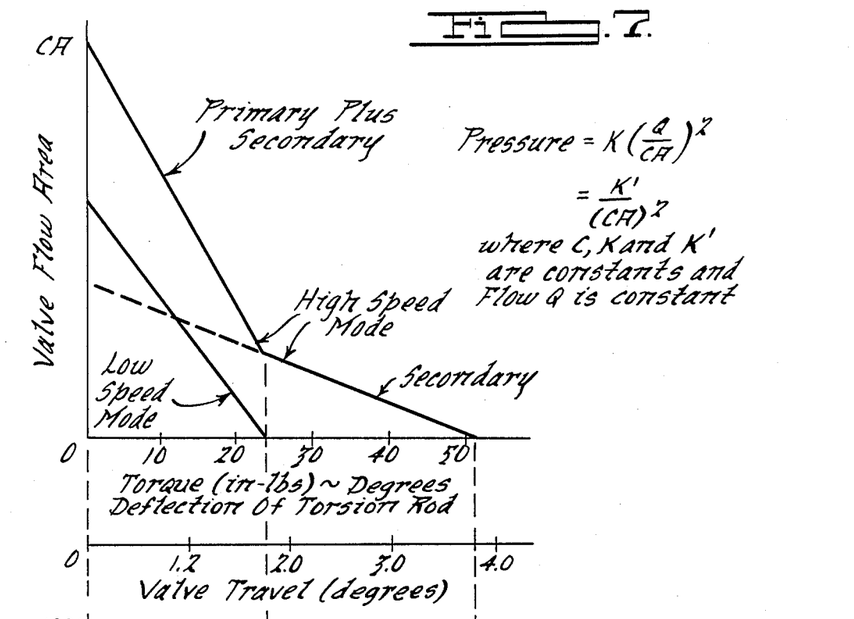
FIG. 7 is a chart showing the relationship between steering torque or torsion bar deflection and valve flow area.

FIG. 7 shows the relationship between the total flow area of the metering valve lands and the torque applied to the torsion bar for each of the two operating modes. The vertical axis represents the sum of the flow areas for the metering lands. In the case of the high speed operating mode the flow areas are the sum of the metering areas for the parking metering lands and the high speed metering lands. In the case of the low speed mode, the valve flow area is the sum of the metering areas for the parking metering lands only.

Figure 8:
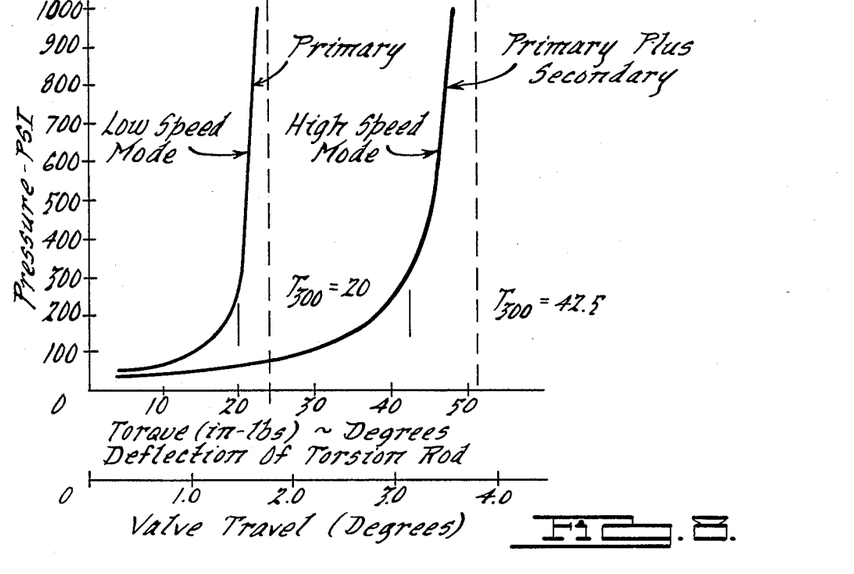
FIG. 8 is a chart showing the relationship between steering torque or torsion bar deflection and steering pressure.

The variation in flow area upon deflection of the torsion bar which produces the characteristic shown in FIG. 7, will result in the pressure relationship shown in FIG. 8. The high speed mode is shown as a flatter characteristic curve which extends to a relatively high deflection value before a significant rise in pressure occurs. A pressure of 300 psi, for example, is achieved in the low speed mode when the torque is 20 lb. - inches whereas that same pressure in the high speed mode is achieved only after the torque in the torsion bar reaches 42.5 lb. - inches.

Having described a preferred form of my invention what I claim and desire to secure by U.S. Letters Patent is:

1. In a fluid pressure operated power steering gear mechanism having a fluid flow source, a pressure movable part adapted to be connected to a steering linkage for a vehicle, a drive member connected to said pressure movable part, a driving shaft connected to said drive member;

the connection between said drive member and said driving shaft comprising a torsion member that accommodates angular displacement of said drive member relative to said driving shaft;

a rotary valve means situated in and partly defining pressure distribution and flow return passages extending to said pressure movable part and to said fluid flow source to effect pressure differential forces acting on said pressure movable part;

said valve means comprising an internal valve member and a surrounding sleeve;

said internal valve member having formed thereon two sets of valve lands, one set being circumferentially offset relative to the other, two sets of internal valve lands formed in said valve sleeve respectively registering with the valve land sets of said internal valve member;

said valve sleeve being connected operatively to said drive member for rotational movement therewith;

vehicle speed sensitive valve means for distributing fluid flow only to a first of said sets of valve lands at low vehicle speeds and for distributing fluid flow to both sets of said valve lands at high vehicle speeds;

said internal valve member being connected to and rotatable with said driving shaft, the first set of said registering valve lands being adapted to control pressure distribution to said pressure movable part during initial deflection of said torsion member and being adapted to effectively increase the magnitude of the pressure distributed to said pressure movable part as said torsion member deflection increases within a first range of deflection during operation at low vehicle speeds and the other set of registering valve lands being adapted to control pressure distribution through said passages to said pressure movable part upon deflection of said torsion bar within a greater range of deflection of said torsion bar as fluid is distributed simultaneously to both valve land sets at higher vehicle speeds.

2. The combination as set forth in claim 1 wherein the first set of said registering valve lands comprises a primary valve means for effectively distributing steering pressure to said pressure movable part and increasing the magnitude of the pressure distributed to said pressure movable part upon an increase in the magnitude of the torque applied to said driving shaft and wherein the other set of registering valve lands comprises a secondary valve means for distributing pressure to said pressure movable part in parallel relationship with respect to the primary valve means thereby increasing the magnitude of the driving shaft torque required to reach a given steering pressure level when the fluid flow is distributed simultaneously to both valve land sets at higher vehicle speeds.

3. The combination as set forth in claim 1 wherein said passages include said rotary valve means and separate passage portions for supplying flow to each of said sets of registering valve lands, said passages including a fluid flow valve means for supplying fluid from said fluid flow source to said second valve land set, and vehicle speed responsive means for actuating said fluid flow valve means to effect flow to both valve land sets when the vehicle speed exceeds a predetermined value.

4. The combination as set forth in claim 2 wherein said passages include said rotary valve means and separate passage portions for supplying flow to each of said sets of registering valve lands, said passages including a fluid flow valve means for supplying fluid from said fluid flow source to said second valve land set, and vehicle speed responsive means for actuating said fluid flow valve means to effect flow to both valve land sets when the vehicle speed exceeds a predetermined value.

5. The combination as set forth in claim 3 wherein said valve lands of said internal valve member are arranged in a high speed set and a low speed set angularly spaced one with respect to the other, the lands of each set being defined by axially extending slots in said inner valve member, the passage portion supplying fluid to said high speed set communicating with said slots for said high speed set, the passage portions supplying fluid to said low speed set communicating with the slots for said low speed set.

6. The combination as set forth in claim 3 wherein said valve lands of said internal valve member are arranged in a high speed set and a low speed set angularly spaced one with respect to the other, the lands of each set being defined by axially extending slots in said inner valve member, the passage portions supplying fluid to said high speed set communicating with said slots for said high speed set across metering lands defined by said internal lands in said sleeve and the lands of said high speed set in said inner valve member, the passage portions supplying fluid to said low speed set communicating with said slots for said low speed set across metering lands defined by said internal lands in said sleeve and the lands of said low speed set in said inner valve member.

* * * * *